United States Patent
Vidyadhara et al.

(10) Patent No.: US 11,841,951 B2
(45) Date of Patent: Dec. 12, 2023

(54) SYSTEMS AND METHODS FOR SECURE MANAGEMENT OF COMPONENTS OF INFORMATION HANDLING SYSTEMS

(71) Applicant: Dell Products, L.P., Round Rock, TX (US)

(72) Inventors: Sumanth Vidyadhara, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 17/231,216

(22) Filed: Apr. 15, 2021

(65) Prior Publication Data

US 2022/0335131 A1   Oct. 20, 2022

(51) Int. Cl.
   G06F 21/57     (2013.01)
   G06F 21/79     (2013.01)
   H04L 67/51     (2022.01)
   H04L 41/34     (2022.01)

(52) U.S. Cl.
   CPC .......... G06F 21/575 (2013.01); G06F 21/572 (2013.01); G06F 21/79 (2013.01); H04L 41/34 (2022.05); H04L 67/51 (2022.05)

(58) Field of Classification Search
   CPC ...... G06F 21/575; G06F 21/572; G06F 21/79; H04L 67/025; H04L 67/51
   See application file for complete search history.

(56) References Cited

U.S. PATENT DOCUMENTS

| | | | | |
|---|---|---|---|---|
| 8,171,272 B1* | 5/2012 | Chester | ................. | G06F 11/004 |
| | | | | 713/1 |
| 8,559,258 B1* | 10/2013 | Stephens, Jr. | ............ | G11C 7/22 |
| | | | | 365/222 |
| 9,110,679 B1* | 8/2015 | Chan | ..................... | G06F 21/572 |
| 9,495,535 B2* | 11/2016 | Suryanarayana | ..... | G06F 21/572 |
| 10,185,828 B2* | 1/2019 | Vidyadhara | .......... | G06F 21/575 |
| 10,606,784 B1* | 3/2020 | Jreij | ..................... | G06F 13/4282 |
| 2004/0236991 A1* | 11/2004 | Brundridge | .............. | H04L 1/24 |
| | | | | 714/25 |

(Continued)

*Primary Examiner* — Nicholas P Celani
*Assistant Examiner* — Wuji Chen
(74) *Attorney, Agent, or Firm* — Fogarty LLP

(57) ABSTRACT

Systems and methods are provided for remotely supporting managed hardware components of an IHS (Information Handling System). Prior to booting an operating system of the IHS, the managed hardware components are enumerated as supporting remote management and a network stack is created in a secured IHS memory, where the network stack is for transfer of remote device management communications directed at the managed hardware components. Still prior to booting the operating system, the IHS chipset is configured to route device management messages received from remote management tools to the network stack. After booting the operating system, a secure remote management session is established between a remote management tool and an IHS device management agent. During operation of the device management agent in the booted operating system, device management messages are retrieved from the network stack and decoded device management messages are delivered to a managed hardware component.

20 Claims, 5 Drawing Sheets

(56) References Cited

U.S. PATENT DOCUMENTS

| | | | |
|---|---|---|---|
| 2009/0178060 A1* | 7/2009 | Winter | G06F 9/4411 719/318 |
| 2010/0138642 A1* | 6/2010 | Cherian | G06F 9/4401 713/2 |
| 2012/0188905 A1* | 7/2012 | Dandekar | H04L 69/325 370/254 |
| 2013/0205063 A1* | 8/2013 | Zhang | G06F 11/1464 711/E12.008 |
| 2015/0143170 A1* | 5/2015 | Andrews | G06F 11/1464 714/15 |
| 2016/0110207 A1* | 4/2016 | Herzi | G06F 9/44505 713/1 |
| 2016/0234095 A1* | 8/2016 | Shetty | H04L 45/02 |
| 2016/0321132 A1* | 11/2016 | Liu | G06F 8/65 |
| 2017/0102952 A1* | 4/2017 | Khemani | G06F 9/4416 |
| 2017/0155573 A1* | 6/2017 | Khemani | H04L 41/0663 |
| 2017/0228237 A1* | 8/2017 | Ponnusamy | G06F 9/4416 |
| 2017/0293520 A1* | 10/2017 | Onniyil | G06F 11/0745 |
| 2018/0293061 A1* | 10/2018 | Arms | G06F 8/654 |
| 2019/0339986 A1* | 11/2019 | Khatri | G06F 13/24 |
| 2020/0042692 A1* | 2/2020 | Bolen | G06F 21/44 |
| 2020/0137079 A1* | 4/2020 | Jreij | G06F 13/4282 |
| 2020/0233983 A1* | 7/2020 | Robison | G06F 21/72 |
| 2020/0244533 A1* | 7/2020 | Gopalarathnam | H04L 41/0893 |
| 2020/0249960 A1* | 8/2020 | Suryanarayana | G06F 9/4416 |
| 2020/0296088 A1* | 9/2020 | Brown | H04L 67/51 |
| 2020/0348946 A1* | 11/2020 | Pant | G06F 11/1417 |
| 2021/0026965 A1* | 1/2021 | Suryanarayana | G06F 21/572 |
| 2021/0026967 A1* | 1/2021 | Suryanarayana | G06F 21/575 |
| 2021/0049071 A1* | 2/2021 | Suryanarayana | G06F 11/2284 |
| 2021/0081012 A1* | 3/2021 | Suryanarayana | G06F 9/4406 |
| 2021/0081534 A1* | 3/2021 | Kumar | G06F 13/4221 |
| 2021/0240491 A1* | 8/2021 | Downum | G06F 9/546 |
| 2021/0240545 A1* | 8/2021 | Kumar | G06F 9/4406 |
| 2021/0383500 A1* | 12/2021 | Suryanarayana | G06T 1/60 |
| 2021/0397577 A1* | 12/2021 | Kahn | H04L 67/1097 |
| 2022/0207126 A1* | 6/2022 | Young | H04L 9/3268 |
| 2022/0207145 A1* | 6/2022 | Young | G06F 21/575 |
| 2022/0292178 A1* | 9/2022 | Iyer | G06F 21/32 |
| 2022/0335131 A1* | 10/2022 | Vidyadhara | H04L 67/51 |
| 2022/0342995 A1* | 10/2022 | Vidyadhara | G06F 9/4411 |
| 2022/0350660 A1* | 11/2022 | Gatson | G06F 9/5016 |
| 2023/0007874 A1* | 1/2023 | Mugunda | G06F 21/629 |

\* cited by examiner

SYSTEMS AND METHODS FOR SECURE MANAGEMENT OF COMPONENTS OF INFORMATION HANDLING SYSTEMS

FIELD

This disclosure relates generally to Information Handling Systems (IHSs), and, more specifically, to systems and methods for secure management of IHSs.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may include a variety of internal hardware components that may be managed locally by management tools that operate on the IHS and/or by a management tool that operates remotely from the IHS. In some instances, hardware components of an IHS may be managed remotely by third parties, such as by a manufacturer or by a seller of the hardware component. Remote management of a hardware component of an IHS by a third party may subject various aspects of the IHS other than the managed component to security vulnerabilities introduced by the third party. Remote management of hardware components of an IHS may be further complicated by scenarios where the hardware components are virtualized such that software programs operating on the IHS interoperate with virtualized instances of a hardware component rather than an actual hardware component.

SUMMARY

In various embodiments, Information Handling Systems (IHSs) may include: a plurality of managed hardware components; a secured memory; one or more processors; and a memory coupled to the processors, the memory storing program instructions that, upon execution by the processors, cause the IHS to: prior to booting an operating system of the IHS, enumerate the plurality of managed hardware components as each supporting remote management; prior to booting the operating system, establish a network stack in the secured memory for transfer of remote device management communications directed at the plurality of managed hardware components; prior to booting the operating system, configure routing of device management messages received from remote management tools operating in support of one or more of the plurality of managed devices to the network stack; after booting the operating system, interface with the remote management tools in establishing a secure remote management session with a device management agent operating on the IHS in support of the plurality of managed devices; and during operation of the device management agent in the booted operating system, retrieve device management messages routed to the network stack and deliver decoded device management messages to a managed hardware component.

In additional IHS embodiments, IHSs may include a remote access controller that provides management of one or more of the plurality of managed hardware components via sideband management couplings with the remote access controller, wherein the device management messages are not routed to the plurality of managed devices via the sideband management couplings. In additional IHS embodiments, the secured memory is a UEFI (Unified Extensible Firmware Interface) memory partition. In additional IHS embodiments, the remote device management messages are not secured by the operating system of the IHS. In additional IHS embodiments, the remote device management communications comprise VDM (Vendor Defined Messages). In additional IHS embodiments, the VDMs directed at the plurality of managed devices are generated by the remote management tools operating in support of one or more of the plurality of managed devices. In additional IHS embodiments, the secure remote management session comprises a PCIe (Peripheral Component Interconnect express) MCTP (Management Component Transport Protocol) management session. In additional IHS embodiments, the PCIe MCTP management session is encrypted within an HTTPS connection between a respective remote management tool and the device management agent.

In various additional embodiments, methods are provided for remotely supporting a plurality of managed hardware components of an IHS (Information Handling System). The methods may include: prior to booting an operating system of the IHS, enumerating the plurality of managed hardware components as each supporting remote management; prior to booting the operating system, establishing a network stack in a secured memory of the IHS, wherein the network stack is for transfer of remote device management communications directed at the plurality of managed hardware components; prior to booting the operating system, configuring a routing of device management messages received from remote management tools operating in support of one or more of the plurality of managed devices to the network stack; after booting the operating system, interfacing with the remote management tools in establishing a secure remote management session with a device management agent operating on the IHS in support of the plurality of managed devices; and through operation of the device management agent, retrieving device management messages routed to the network stack and deliver decoded device management messages to a managed hardware component.

In additional method embodiments, the secured memory is a UEFI (Unified Extensible Firmware Interface) memory partition. In additional method embodiments, the remote device management communications comprise VDM (Vendor Defined Messages). In additional method embodiments, the VDMs directed at the plurality of managed devices are generated by the remote management tools operating in support of one or more of the plurality of managed devices. In additional method embodiments, the secure remote management session comprises a PCIe (Peripheral Component Interconnect express) MCTP (Management Component Transport Protocol) management session. In additional method embodiments, the PCIe MCTP management session is encoded within an HTTPS connection between a respective remote management tool and the device management agent.

In various additional embodiments, systems are provided for remotely supporting a plurality of managed hardware components of an IHS (Information Handling System). The systems may include: a workspace orchestration layer that is remote from the IHS and that manages deployment of workspaces on the IHS; and the IHS comprising: a plurality of managed hardware components; a secured memory; one or more processors; and a memory coupled to the processors, the memory storing program instructions that, upon execution by the processors, cause the IHS to: prior to booting an operating system of the IHS, enumerate the plurality of managed hardware components as each supporting remote management; prior to booting the operating system, establish a network stack in the secured memory for transfer of remote device management communications directed at the plurality of managed hardware components; prior to booting the operating system, configure routing of device management messages received from remote management tools operating in support of one or more of the plurality of managed devices to the network stack; after booting the operating system, interface with the remote management tools in establishing a secure remote management session with a device management agent operating on the IHS in support of the plurality of managed devices, wherein the device management agent comprises a workspace generated based on a workspace definition provided by the workspace orchestration layer; and during operation of the device management agent in the booted operating system, retrieve device management messages routed to the network stack and deliver decoded device management messages to a managed hardware component.

In additional system embodiments, the secured memory is a UEFI (Unified Extensible Firmware Interface) memory partition. In additional system embodiments, the remote device management communications comprise VDM (Vendor Defined Messages). In additional system embodiments, the VDMs directed at the plurality of managed devices are generated by the remote management tools operating in support of one or more of the plurality of managed devices. In additional system embodiments, the secure remote management session comprises a PCIe (Peripheral Component Interconnect express) MCTP (Management Component Transport Protocol) management session. In additional system embodiments, the PCIe MCTP management session is encrypted within an HTTPS connection between a respective remote management tool and the device management agent.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
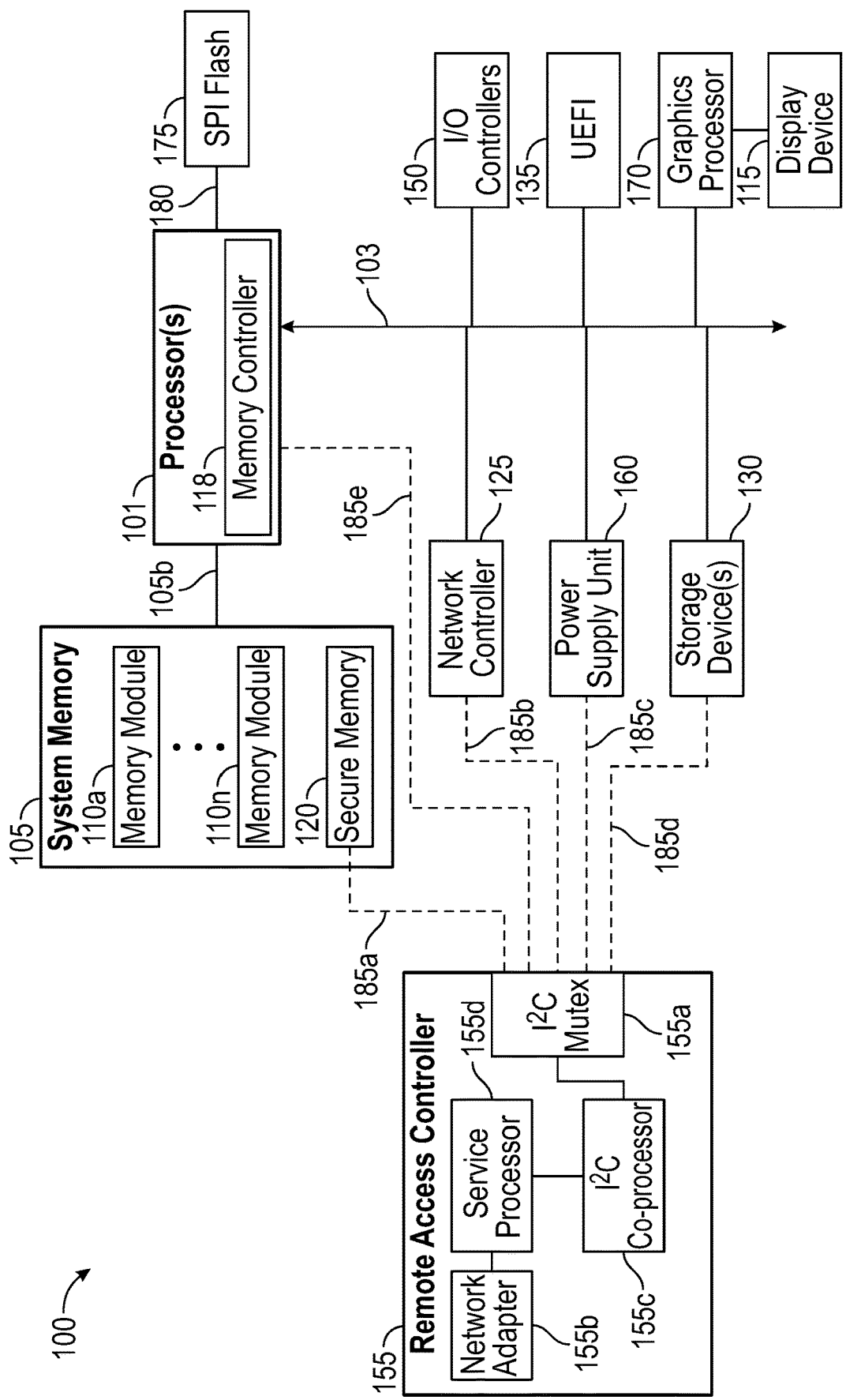
FIG. 1 is a diagram illustrating certain components of an IHS operable, according to some embodiments, to support secure remote management of components of the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting certain components of an illustrative IHS 100 that is operable according to various embodiments for secure remote management of hardware components of the IHS 100. In some embodiments, in addition to support remote management of internal hardware components, IHS 100 may be employed to instantiate, manage, and/or terminate a secure workspace that may provide the user of IHS 100 with access to protected data in an isolated software environment in which the protected data is segregated from: the operating system (OS) of the IHS 100, other applications executed by IHS 100, other workspaces operating on IHS 100 and, to a certain extent, the hardware of the IHS. In some embodiments, the construction of a workspace for a particular purpose and for use in a particular context may be orchestrated remotely from the IHS 100 by a workspace orchestration layer, such as described with regard to FIG. 2. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 105b.

System memory 105 that is coupled to processor(s) 101 via memory bus 105b provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In IHS 100, chipset 103 is illustrated as a single coupling with processor 101. However, other implementations may utilize any number of connections to provide the illustrated communication pathways supported by chipset 103. In some instances, chipset 103 may be referred to as a PCH (Platform Controller Hub). In some instances, chipset 103 may utilize PCIe (Peripheral Component Interconnect express) connections in establishing communications with various hardware components of IHS 100, such as network controller 125, BIOS/UEFI 135, storage devices 130, I/O controllers 150, power supply unit 160, graphics processor 170 and/or various other hardware components. As described in additional detail below, such PCIe couplings with hardware components of IHS 100 may be utilized to support remote management of these hardware components.

In certain embodiments, IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100.

As illustrated, processor(s) 101 may also be coupled to a network controller 125, such as provided by a Network Interface Controller (NIC) that is coupled to the IHS 100 and allows the IHS 100 to communicate with other systems, such as other IHSs similarly configured to IHS 100, via an external network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In some embodiments, network controller 125 may be instrumented with a controller or other logic unit that supports a sideband management connection 185b with remote access controller 155. As illustrated, network controller 125 may also be managed via an in-band connection, such as an MCTP (Management Component Transport Protocol) PCIe connection, supported by chipset 103. As described in additional detail below, network controller 125 may be managed remotely using VDM (Vendor-Defined Messages) transmitted to IHS 100 by a remote management tool.

Chipset 103 may also support communications with one or more display device(s) 115 via graphics processor 170. In certain embodiments, graphics processor 170 may be comprised within one or more video or graphics cards or an embedded controller installed as components of the IHS 100. Graphics processor 170 may generate display information and provide the generated information to one or more display device(s) 115 coupled to IHS 100, where display device(s) 115 may include integrated display devices and/or external display devices coupled to IHS. In certain embodiments, some or all of the functions supported by graphics processor 170 may be integrated within processor 101. The one or more display devices 115 coupled to IHS 100 may utilize LCD, LED, OLED, or other thin film display technologies. Each display device 115 may be capable of touch input such as via a touch controller that may be a component of display device 115, graphics processor 170, or a separate component of IHS 100 accessed via bus 103. In some embodiments, graphics processor 170 may be managed via an in-band connection, such as an MCTP PCIe connection, supported by chipset 103. As described in additional detail below, graphics processor 170 may be managed remotely using VDMs transmitted to IHS 100 by a remote management tool.

In certain embodiments, chipset 103 may utilize one or more I/O controllers 150 to access various I/O hardware components such as user input devices and sensors. For instance, I/O controllers 150 may provide access to user-input devices such as a keyboard, mouse, touchpad, touchscreen and/or other peripheral input devices. User input devices may interface with a I/O controller 150 through wired or wireless connections. Sensors accessed via I/O controllers 150 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). In some embodiments, each I/O controller 150 of IHS 100 may be managed via an in-band connection, such as an MCTP PCIe connection, supported by chipset 103. As described in additional detail below, each I/O controller 150 may be managed remotely using VDMs transmitted to IHS 100 by a remote management tool.

In some embodiments, the data inputs collected by such sensors may be received by sensor hub capable of utilizing this information in determining various physical characteristics of the location and manner in which IHS 100 is being utilized. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or by a network interface. In some embodiments, the sensor hub may support additional sensors, such as optical, infrared and sonar sensors, that may provide support for xR (virtual, augmented, and/or mixed reality) sessions hosted by the IHS 100 and may be used by the sensor hub to provide an indication of a user's presence near IHS 100, such as whether a user is present, absent, and/or facing the integrated display 115.

Chipset 103 also provides processor(s) 101 with access to one or more storage devices 130. In various embodiments, a storage device 130 may be integral to the IHS 100, or may be external to the IHS 100. In certain embodiments, storage device 130 may be accessed via a storage controller that may be an integrated component of the storage device. Storage device 130 may be implemented using any memory technology allowing IHS 100 to store and retrieve data. For instance, storage device 130 may be a magnetic hard disk storage drive or a solid-state storage drive. In some embodiments, storage device 130 may be a system of storage devices, such as a cloud drive accessible via network controller 125. In some embodiments, storage device 130 may be instrumented with a controller or other logic unit that supports a sideband management connection 185d with remote access controller 155. In some embodiments, each storage device 130 of IHS 100 may also be managed via an in-band connection, such as an MCTP PCIe connection, supported by chipset 103. As described in additional detail below, each storage device 130 may be managed remotely using VDMs transmitted to IHS 100 by a remote management tool.

IHS 100 may also include a UEFI (Unified Extensible Firmware Interface) 135 or BIOS (Basic Input/Output System) component that may include instructions stored in a non-volatile memory that may be accessible by processor 101. The UEFI 135 provides an abstraction layer that allows an operating system of the IHS 100 to interface with the hardware components of the IHS 100. Accordingly, UEFI 135 provides an abstraction layer to the firmware utilized by various hardware components of IHS 100. In some embodiments, UEFI 135 may be implemented using a dedicated microcontroller coupled to the motherboard of IHS 100. In some embodiments, UEFI 135 may operate on processor 101 and may operate based on firmware retrieved from a secure storage, such as SPI Flash 175 or another secure Flash memory of IHS 100. In some embodiments, some or all of UEFI 135 may be implemented as operations of an embedded controller, such remote access controller 155. Upon powering or restarting IHS 100, processor(s) 101 may utilize UEFI 135 to initialize and test various hardware components of the IHS 100. Upon successful validation of these hardware components, in some embodiments, UEFI 135 may also initiate loading of an operating system for use by the IHS 100. Also as described in additional detail below, a secure storage partition that is access exclusively via UEFI 135 may be used in some embodiments to implement a network stack that stores received remote management messages, such as VDMs, directed at individual managed devices of IHS 100.

As illustrated, IHS 100 may also include a power supply unit 160 that provides the hardware components of IHS 100 with appropriate levels of DC power. Power inputs received via a power port or via USB ports may be routed to the power supply unit 160 of IHS 100. The power inputs received by power supply unit 160 may be used in powering the operations of IHS 100 and in recharging internal batteries of IHS 100. In some embodiments, power supply unit 160 may support power outputs drawn from the internal batteries of IHS 100 and provided to external devices coupled to IHS 100, such as USB devices coupled to USB ports of IHS 100. In some embodiments, power supply unit 160 may provide power to components of IHS 100 using multiple independent power planes. For instance, as described below, remote access controller 155 may be powered from a separate power plane from processor 101. In some embodiments, power supply unit 160 may be managed via an in-band connection, such as an MCTP PCIe connection, supported by chipset 103. As described in additional detail below, power supply unit 160 may be managed remotely using VDM (Vendor-Defined Messages) transmitted to IHS 100 by a remote management tool.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 155 may operate from a different power plane from processors 101, storage devices 130, network controller 125 and various other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 101, 120, 125, 130, 160 of an IHS via a sideband bus interface. For instance, messages utilized in device management may be transmitted using I2C sideband bus connections 185a-e that may be individually established with each of the respective managed devices 101, 120, 125, 130, 160 through the operation of an I2C multiplexer 155a of the remote access controller. As illustrated, managed devices 125, 130, 160 of IHS 100 are coupled to the IHS processor(s) 101 via one or more in-band buses supported by chipset 103, where these in-band busses are separate from the I2C sideband bus connections 185*b-d* used for device management. Accordingly, managed devices 125, 130 and 160 communicate with the operating system of IHS 100 via in-band buses supported by chipset 103, while the sideband buses 185*b-d* are used by managed devices exclusively for communications with remote access controller 155.

In certain embodiments, a service processor 155*d* of remote access controller 155 may rely on an I2C co-processor 155*c* to implement sideband I2C communications between the remote access controller 155 and managed components 101, 120, 125, 130, 160 of the IHS. The I2C co-processor 155*c* may be a specialized co-processor or micro-controller that is configured to interface via a sideband I2C bus interface with the managed hardware components 101, 120, 125, 130, 160 of IHS. In some embodiments, the I2C co-processor 155*c* may be an integrated component of the service processor 155*d*, such as a peripheral system-on-chip feature that may be provided by the service processor 155*d*. Each I2C bus 185*a-e* is illustrated as single line in FIG. 1. However, each I2C bus 185*a-e* may be comprised of a clock line and data line that couple the remote access controller 155 to endpoints 101, 120, 125, 130, 160 on each of the managed components.

As illustrated, the I2C co-processor 155*c* may interface with the individual managed devices 101, 120, 125, 130, 160 via individual sideband I2C buses 185*a-e* selected through the operation of an I2C multiplexer 155*a*. Via switching operations by the I2C multiplexer 155*a*, a sideband bus connection 185*a-e* may be established through a direct coupling between the I2C co-processor 155*c* and each of the individual managed devices 101, 120, 125, 130, 160. In providing sideband management capabilities, the I2C co-processor 155*c* may interoperate with corresponding endpoint I2C controllers that implement the I2C communications of the respective managed devices 101, 120, 125, 130, 160. The endpoint I2C controllers may be implemented as dedicated microcontrollers for communicating sideband I2C messages with the remote access controller 155, or endpoint I2C controllers may be integrated SoC functions of a processor of the respective managed device endpoints 101, 120, 125, 130, 160.

In some embodiments, remote access controller 155 may perform various operations in support of the delivery and deployment of workspaces to IHS 100. In certain embodiments, remote access controller 155 may interoperate with a remote orchestration service via the described out-of-band communications pathways that are isolated from the operating system that runs on IHS 100. In some embodiments, a network adapter 155*b* that is distinct from network controller 125 utilized by the operating system of IHS 100 may support such out-of-band communications between remote access controller 155 and a remote orchestration service. Via this out-of-band signaling pathway, remote access controller 155 may receive authorization information that may be used for secure delivery and deployment of a workspace to IHS 100 and to support secure communication channels between deployed workspaces and various capabilities supported by IHS 100, while still maintaining isolation of the workspaces from the hardware and operating system of IHs 100.

In some embodiments, authorization and cryptographic information received by remote access controller 155 from a remote orchestration service may be stored to secured memory 120. As illustrated in FIG. 1, in some embodiments, remote access controller 155 may access secured memory 120 may via an I2C sideband signaling pathway 185*a* between I2C multiplexer 155*a* and an I2C communication capability supported by secure memory 120. Remote access controller 155 may support execution of a trusted operating environment that supports secure operations that are used to deploy a workspace on IHS 100. In certain embodiments, remote access controller 155 may calculate signatures that uniquely identify various hardware and software components of IHS 100. For instance, remote access controller 155 may calculate hash values based on instructions and other information used to configure and operate hardware and/or software components of IHS 100. For instance, remote access controller 155 may calculate a hash value based on firmware and on other instructions or settings of a component of a hardware component. In some embodiments, hash values may be calculated in this manner as part of a trusted manufacturing process of IHS 100 and may be stored in the secure storage 120 as reference signatures used to validate the integrity of these components at a later time. In certain embodiments, a remote orchestration service supporting the deployment of workspaces to IHS 100 may verify the integrity of the remote access controller 155 in a similar manner, by calculating a signature of remote access controller 155 and comparing it to a reference signature calculated during a trusted process for manufacture of IHS 100.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
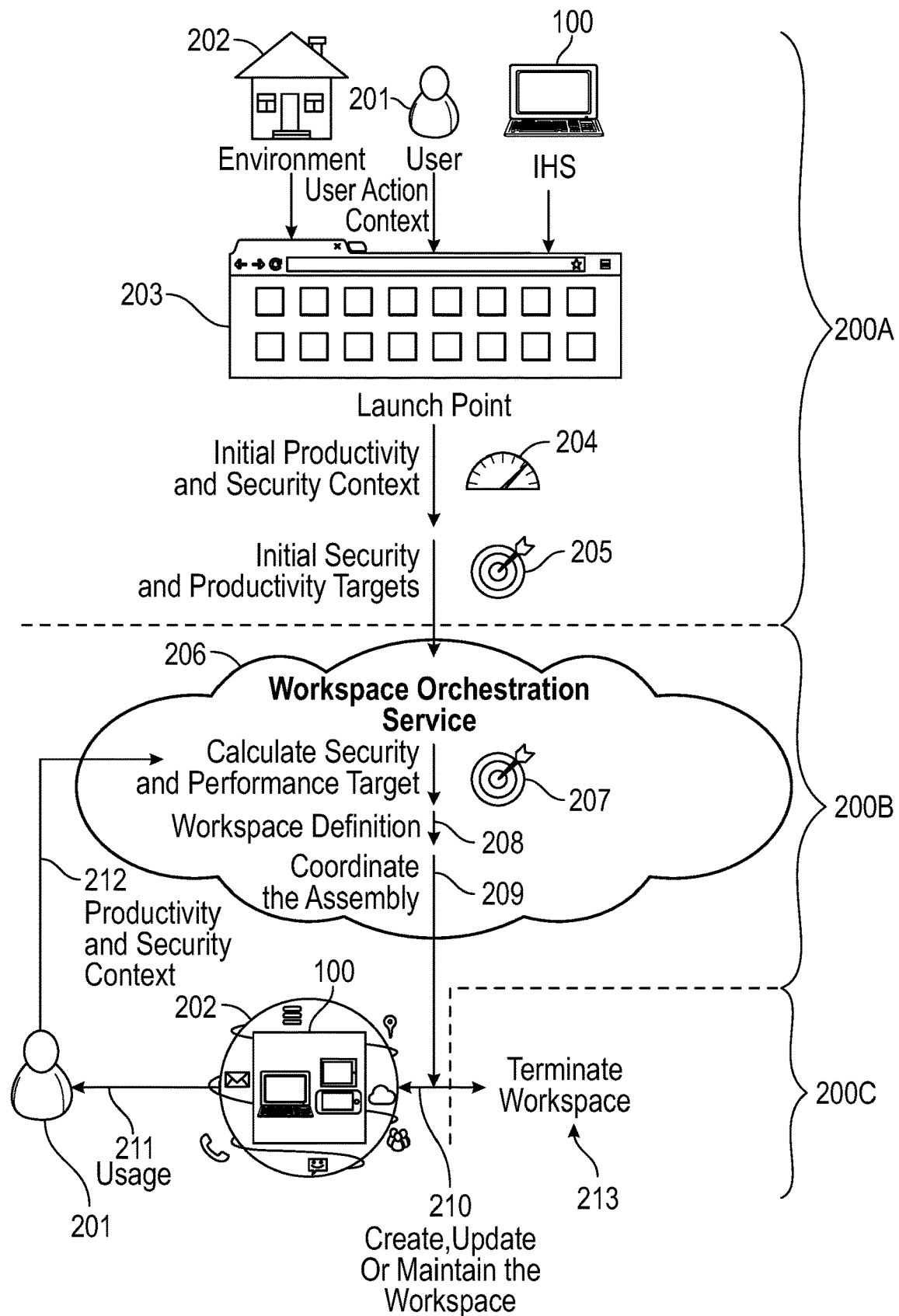
FIG. 2 is a diagram depicting illustrative embodiments of methods and system for deployment and management of workspaces on an IHS in a manner that supports secure remote management of components of the IHS.

FIG. 2 is a diagram depicting illustrative embodiments of methods and system for deployment and management of workspaces on an IHS in a manner that supports secure remote management of components of the IHS. As provided above, virtualized environments, such as the workspaces described herein, may operate in isolation from other software processes operating on an IHS and/or from the hardware of the IHS. Being isolated from hardware of the IHS entails the workspace abstracting the hardware components of the IHS. Once abstracted, the hardware of the IHS may be utilized concurrently by multiple different workspaces, each operating in isolation from each other and without awareness that the underlying hardware is concurrently supporting other workspaces. Despite the hardware of the IHS being abstracted in such workspace scenarios, remote management of the hardware components of the IHS may nonetheless base device management determinations on information provided by software applications operating within a workspace that virtualizes the managed device. However, since the managed device is virtualized from such workspaces, remote management tools are unable to transmit device management messages to the devices via these workspaces that operate in isolation from the device. Embodiments accordingly support capabilities for remote management of devices of an IHS in such scenarios. As described in additional detail with regard to FIGS. 3 and 4, embodiments also support remote management of components of an IHS in a manner in which third parties may remotely support such hardware components of an IHS without reliance on security measures of the operating system of the IHS and without exposing components operating within a root of trust of the IHS to remote management operations being provided by such third parties supporting hardware components of the IHS.

For sake of explanation, the workspace lifecycle supported by embodiments has been split into three phases: workspace initialization phase 200A, workspace orchestration phase 200B, and workspace termination phase 200C. During initialization 200A, user 201 operates an IHS 100, such as described with regard to FIG. 1, within a physical environment 202 (e.g., any type of environment and its associated context, including physical location, geographic location, location within a particular facility or building, detected networks, time of day, proximity of the user, individuals in the vicinity of IHS 100, etc.).

The illustrated method for the workspace lifecycle according to embodiments may be initiated with an action by user 201 at a user interface that serves as a launch point 203 for initiating a workspace. In various instances, launch point 203 may be a corporate launch point provided by an employer of user 201, a manufacturer launch point provided by the manufacturer of IHS 100, or a third-party launch point provided as a service to user 201 by a third-party. In various instances, user 201 may operate IHS 100 to access a launch point 203 that is provided in the form of a web portal, a portal application running in the operating system of IHS 100, or a special-purpose portal workspace operating on IHS 100. In various embodiments, launch point 203 may be implemented using graphical, textual and/or audio interfaces by which data or other resource may be requested by a user 201. In various implementations, launch point 203 may include Graphical User Interface (GUI) elements, such as icons, that represent different software applications, data sources and/or other resources that the user may select for use via a workspace. As such, launch point 203 may provide a user with an ability to request initiation of a workspace that process access to software applications and data sources that are available to the user 201.

In some embodiments, workspaces for providing user 201 with access to protected data or other resources may operate using a local management agent that operates on IHS 100 and is configured to interoperate with workspace orchestration layer 206. As described, launch point 203 may be provided in the form of a portal (e.g., a webpage, OS application or special purpose workspace) that includes a user interface that allows user 201 to request access to managed resources. In some embodiments, launch point 203 may be hosted by the local management agent that runs on IHS 100 and interoperates with remote workspace orchestration layer 206. Examples of launch point 203 technologies may include WORKSPACE ONE INTELLIGENT HUB from WMWARE, INC., and DELL HYBRID CLIENT from DELL TECHNOLOGIES INC., among others.

The workspace orchestration layer 206 and IHS 100 may be coupled to each other via any suitable network technology and/or protocol which allows workspace orchestration layer 206 to interoperate with IHS 100. As described with regard to FIG. 1, an IHS 100 according to embodiments may include a component such as a remote access controller 155 that may support secure out-of-band communications that are independent from the operating system of IHS 100. In some embodiments, such a remote access controller may be configured to utilize such out-of-band communication capabilities to support deployment and operation of workspaces on IHS 100 and to report changes in context information to the workspace orchestration layer 206.

Initialization phase 200A begins when user 201 chooses to launch an application or access a data source that is managed by the workspace orchestration layer 206. In response to an access request issued by user 201 (e.g., the user "clicks" on an icon presented by launch point 203), at 204, local management agent of IHS 100 collects initial security context information and productivity context information. In various embodiments, the security context information of a workspace may include attributes indicating a security risk associated with: the data and/or application being requested, a level of risk presented by the user 201, the hardware of the IHS 100, the logical software environment of IHS 100 in which a workspace will be deployed, and the physical environment 202 in which IHS 100 is currently located. Accordingly, in this disclosure, a "security context" generally refers to data or other information related to a security posture in which a workspace will be deployed and utilized, where the security posture may be based on characteristics of user 201, IHS 100, the data and/or application to be accessed via the workspace, and/or environment 202. In some embodiments, a security context may be quantified as a security risk score in support of evaluations of the level or risk associated with providing user 201 access to requested data and/or application while using IHS 100 in the particular context.

In various embodiments, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the operating system and other applications in use on IHS 100, availability of encryption, type of available encryption, access to secured storage, use of attestable hardware by IHS 100, and supported degree of workspace isolation by IHS 100.

In this disclosure, "productivity context" generally refers to user 201 productivity associated with a workspace, user 201, IHS 100, and/or environment 202. A "productivity score" generally refers to an index usable to score, quantify, or measure various productivity characteristics of a productivity context. Examples of productivity context information may include, but are not limited to: the hardware of the IHS 100 that is available for use in support of a workspace, the software of the IHS 100 that is available for use in support of the workspace, power states of IHS 100 and/or hardware components of IHS 100, maximum clock frequencies of hardware components of IHS 100 that can currently be supported, maximum operating speeds of software components of IHS 100, peripheral devices coupled to IHS 100 and networks available for use by IHS 100 in supporting the workspace.

Initial productivity and security targets for a workspace may be calculated, at 205, based on the context of user's 201 actions combined with the productivity and security context in which the workspace will operate. In some cases, at 205, a local management agent 332 operating on IHS 100 may calculate initial security and productivity targets based upon the collected security and productivity context. In other cases, remote workspace orchestration service 206 may calculate security and productivity targets for a workspace. In this disclosure, "security target" generally refers to the attack surface presented by a workspace that is created and operated based on a specific workspace definition, while "productivity target" generally refers to the productivity characteristics of a specific workspace definition. Examples of a productivity target characteristics include, but are not limited to: types of data or data sources available to user 201 within a workspace, latency of the workspace, software applications available within the workspace, responsiveness of the workspace and remaining computational overhead available to the workspace. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces and the ability to extend a workspace. In some instances, productivity and security targets may also be based on user's 201 behavioral analytics, IHS 100 telemetry and/or environmental information that is collected via sensors of IHS 100.

In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of the security context (e.g., location, patch level, threat information, network connectivity, etc.) and the productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 that is configured for operation with the workspace orchestration layer 206.

In specifying capabilities and constraints of a workspace, a workspace definition 208 may prescribe one or more of: authentication requirements for user 201, types of containment and/or isolation of the workspace (e.g., local application, sandbox, docker container, progressive web application (PWA), Virtual Desktop Infrastructure (VDI), virtual machine), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), and workspace capabilities available to independently attach other resources.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration layer 206 may autonomously add that application to the default workspace definition for that user.

Still with respect to FIG. 2, during an orchestration phase 200B of workspace deployment, at 208, the initial security and productivity targets are processed and/or reconciled against resources, IHS capabilities, and cloud services capabilities in order to produce a workspace definition. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace, applications to be provided for operation within the workspace, aggregation of resources available via the workspace, configurations for accessing data or resources (e.g., required use of a virtual private network (VPN)).

In some embodiments, the initial workspace definition may then be utilized by an automation engine of workspace orchestration layer 206 to coordinate the assembly 209 and instantiation 210 of a workspace on an appropriate platform (e.g., on the cloud, on IHS 201, or some combination of the two) based on the security and productivity contexts in which the workspace will operate. In some embodiments, automation engine may resolve configuration conflicts between a workspace definition and the user's inputs in the operation of a workspace. In cases where a workspace is cloud-hosted, the automation engine may assemble and instantiate a remote workspace that may be accessed via a secure connection established via a web browser or other web-based component operating on the IHS 100.

At 211 of FIG. 2, the instantiated workspace is operated by user 201 and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation, at 207, of the security and performance targets by automation engine. Additionally or alternatively, a new workspace context, security target, and/or productivity target may be now measured against the initial targets, and the result may cause automation engine to produce a new workspace definition at 208.

Particularly, if the instantiated workspace(s) have security or productivity parameters that fall outside of a range of the target scores for these parameters such that a difference between an updated context information and the previous context information is scored below a threshold value, automation engine may generate modifications to an existing workspace and, at 210, may deploy an updated workspace according to the modified definition. Conversely, if the difference between an updated context information and the previous context information is scored above a threshold value, automation engine may generate a new workspace at 210. Session data metadata and context may be preserved by data aggregation engine of the orchestration layer 2507, such that session data may be restored in the new workspace as applicable.

Various conditions may trigger termination of a workspace at 213, as part of termination phase 200C. In some cases, user action may initiate the termination of a workspace (e.g., user 201 closes application or browser accessing data). In other cases, termination of a workspace may take place automatically as part of an adjustment in workspace definition (e.g., the workspace is terminated by automation engine in order to support a new or updated workspace). As part of a termination phase 200C of a workspace, various workspace resources of IHS 100 and/or at workspace orchestration layer 206 may be released.

Figure 3:
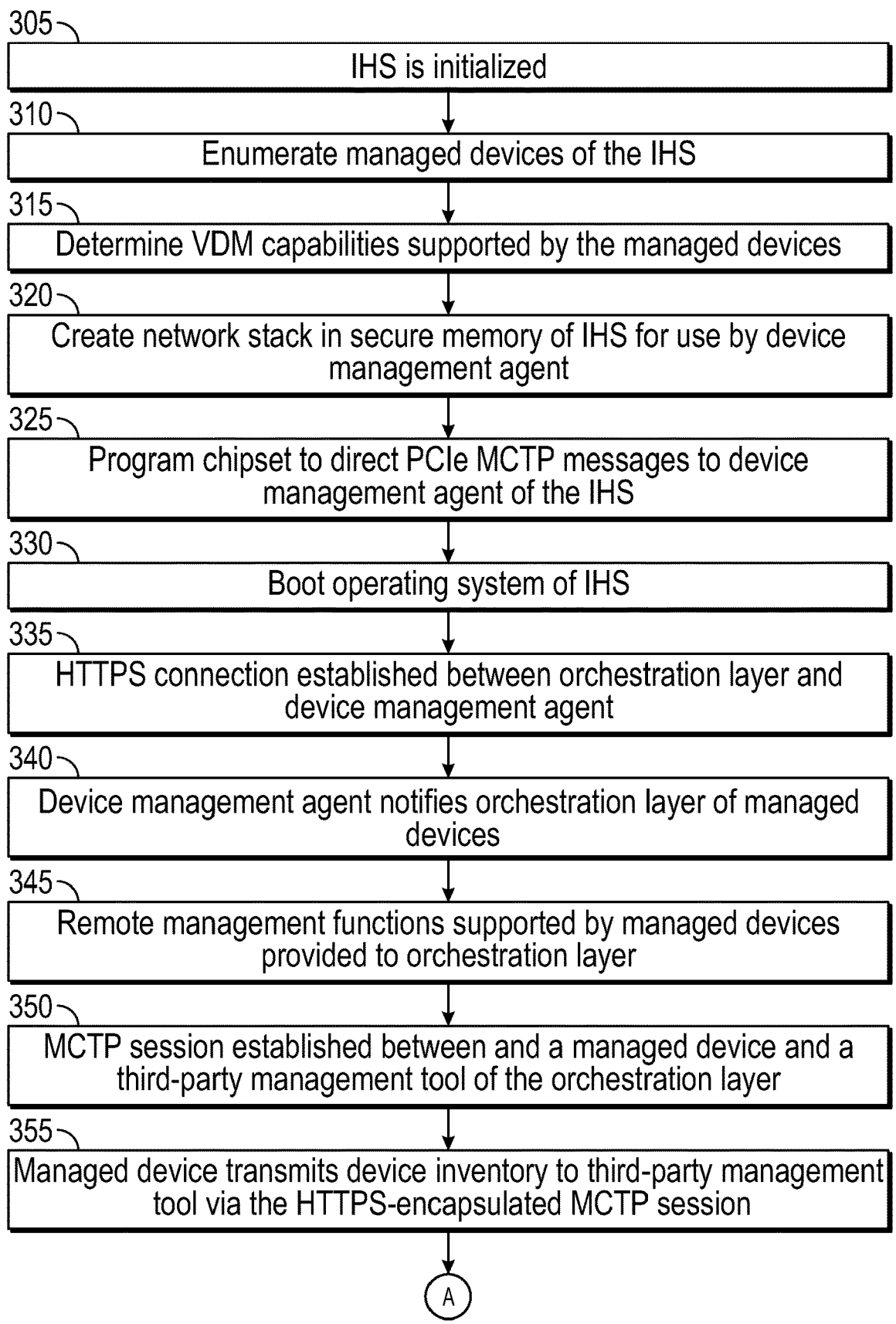
FIG. 3 is a flowchart describing certain steps of a method, according to some embodiments, for secure remote management of components of an IHS.
Figure 3:
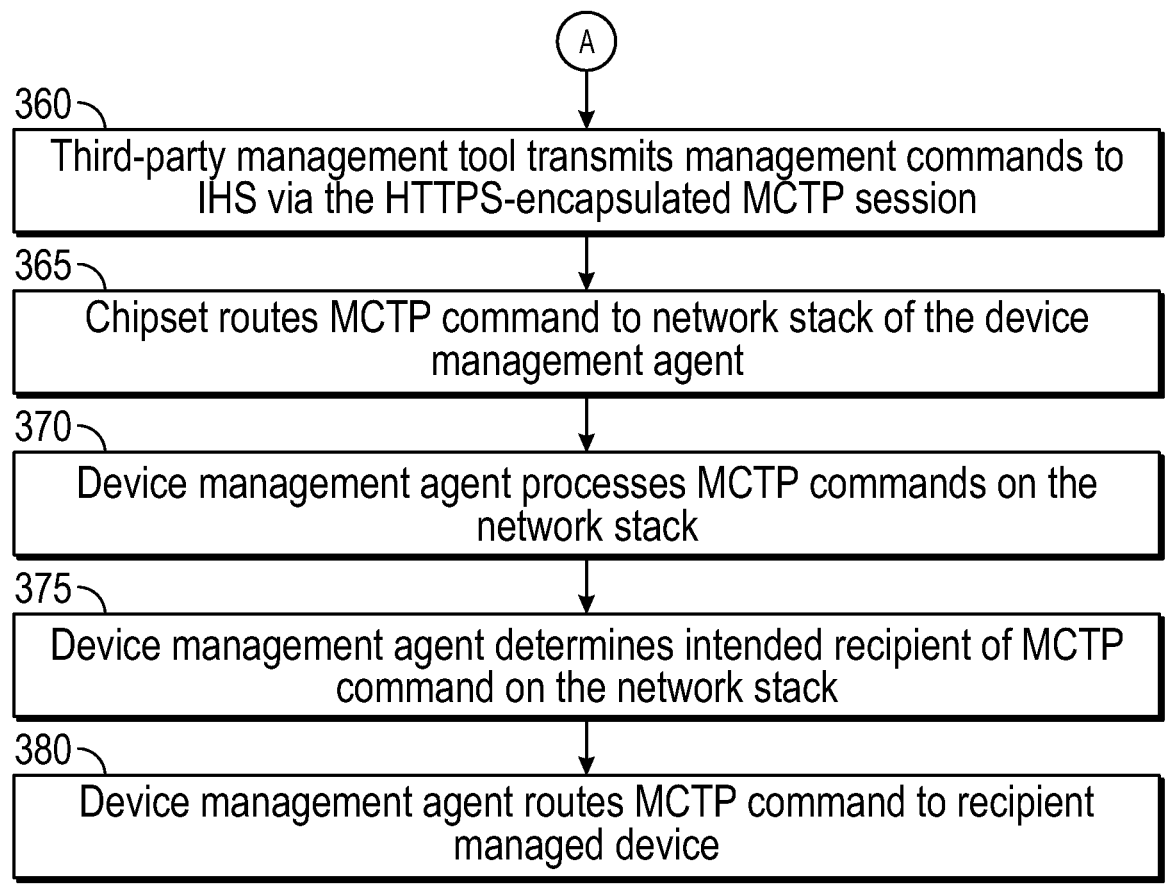

FIG. 3 is a flowchart describing certain steps of a method, according to some embodiments, for configuring secure remote management of internal hardware components of an IHS. As illustrated in FIG. 3, embodiments may begin, at 305, with the initialization of an IHS that is configured according to the embodiments described above. As described above, in some embodiments, prior to booting the operating system of the IHS, initialization procedures may include the validation of instructions utilized by various hardware components of the IHS. For instance, firmware instructions to be loaded by a remote access controller of the IHS may be used to generate a hash value that is compared to a digital signature stored in a secure memory of the IHS, where the digital signature corresponds to authentic firmware instructions stored for use by the remote access controller during a trusted manufacturing process of the IHS, or during another trusted administrative process. In this same manner, the firmware instructions that are utilized by various hardware components of the IHS may be successively validated against stored reference signatures in order to iteratively expand a root of trusted hardware components of the IHS. As described above, once the instructions utilized by the remote access controller have been validated, the remote access controller may utilize these instructions to communicate with a remote workspace orchestration layer in establishing secure use of workspaces on the IHS. Even though such a remote access controller may support sideband management of various hardware components of the IHS, embodiments support remote management of hardware components of an IHS by third parties without exposing a remote management controller such as described herein to such third parties in any manner.

Once the root of trust has been established by the remote access controller, various other initialization procures may proceed, including the powering and initializing the various hardware components of the IHS. As described with regard to FIG. 1, the hardware devices of an IHS may include various types of managed devices. As indicated in FIG. 3, at 310, initialization of the IHS may proceed with enumeration of the managed devices of the IHS. In embodiments where the devices may be managed by PCIe connections supported by the operating system of the IHS, the chipset of the IHS may be configured to identify the managed devices as PCIe endpoints and to enumerate the managed devices via these PCIe connections as part of the initialization of the IHS. In some embodiments, managed devices that are supported using a different type of bus coupling may be similarly enumerated by the chipset. As part of these enumeration procedures, at 315, the chipset may identify managed devices that support remote management according to the embodiments described herein. In some embodiments, managed devices identified by the chipset may include all managed devices that support management using PCIe MCTP communications.

In order to provide support for remote management for these identified components that are determined as compatible with embodiments, at 320, the chipset may create a network stack within a secure memory of the IHS for use in support of VDM communications with these managed devices. As described in additional detail with regard to FIG. 4, this network stack may be a memory partition within a secure memory that is accessed using UEFI firmware instructions of the IHS, or a partition within another secure memory of the IHS that is accessible by the operating system and also by these pre-boot operations. Once this network stack has been established, at 325, the chipset may be configured to direct received PCIe MCTP communications to this network stack, rather than routing them through existing PCIe device management capabilities that are supported by the operating system of an IHS. With these initialization procedures complete, at block 330, the operating system of the IHS may be booted.

As described with regard to FIG. 2, an IHS according to embodiments may support use of secure workspaces that operate according to a workspace definition and that provide isolated operating environments that may run within an operating system of the IHS, or separate from the operating system of an IHS. Also as described above, such workspaces may be supported by a remote orchestration layer that provides the workspace definition used in initializing and operating a workspace on a particular IHS. In some embodiments, remote management of hardware components of an IHS may be supported via such an orchestration layer and, in particular, by third-party component management services and tools that interface with the orchestration layer and are configured to manage hardware components of an IHS remotely, such as using VDM communications transmitted via PCIe MCTP sessions. As described in additional detail with regard to FIG. 4, remote device management supported by embodiments may utilize a device management agent that operates within the operating system, and in some embodiments, may be a workspace that is configured to operate as described herein according to capabilities set forth in a workspace definition provided by the orchestration layer.

Figure 4:
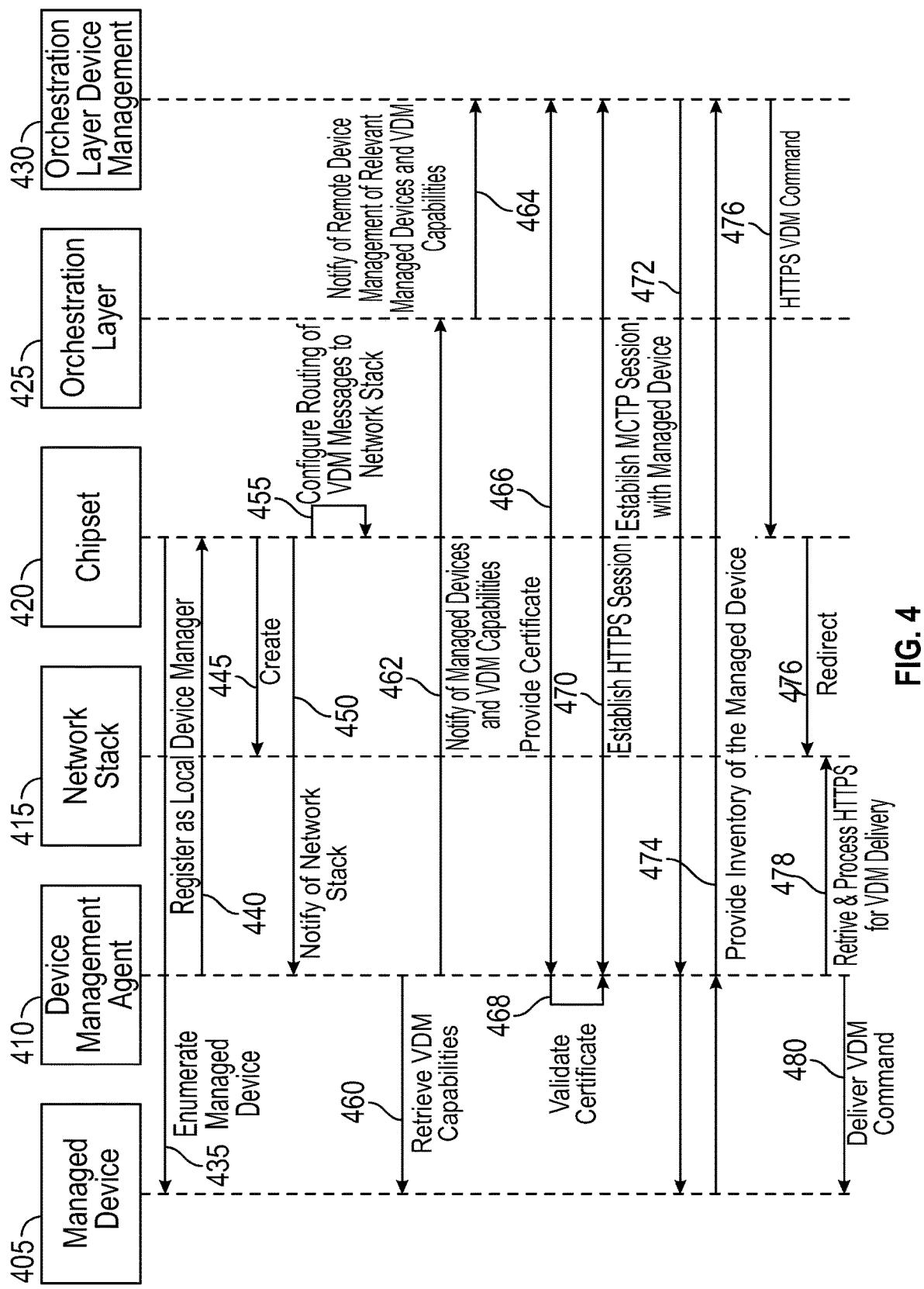
FIG. 4 is a swim lane diagram describing the operation of certain components of a system, according to some embodiments, in configuring secure remote management of components of an IHS.

Once a device management agent has been initialized, at 335 and as described in additional detail with regard to FIG. 4, an HTTPS session is established between the orchestration layer and the device management agent. Via this secured HTTPS session, at 340, the device management agent notifies the orchestration layer of the managed devices that were enumerated and that were identified as compatible with the described device management embodiments. In addition, at 345, the device management agent may also utilize the secured HTTPS session to notify the orchestration layer of the VDM capabilities supported by each of the compatible managed devices. As described, embodiments provide capabilities by which third parties may remotely manage components of an IHS without exposing sideband management components, such as the described remote access controller, and without relying strictly on the security measures provided by an operating system of the IHS. Accordingly, these secure HTTPS communications between the orchestration layer and the device management agent provide the capability for a limited range of device management communications that are secure and also isolated from the operating system of the IHS.

At 350, the secure HTTPS session is utilized by a third-party to establish an MCTP session between a management tool utilized by the third-party and a specific managed device that has been enumerated by the device management agent and identified to the orchestration layer as a compatible managed device. Once an MCTP session has been established, the secure HTTPS communications may be further used, at 355, by the managed device in order to report an inventory of the device to the third-party management tool. For instance, the inventory may specify the firmware or other instructions that are in use by the managed device. The inventory may also specify security protocols implemented by the managed device. In some embodiments, the inventory may also specify power management capabilities that are supported by the managed device.

Based on the inventory information provided by the managed device, the third-party management tool may determine management operations to be conducted in support of the managed device. For instance, based on firmware information reported in the inventory of the managed device, the third-party management tool may determine that updated firmware should be pushed to the managed device. In another example, power management operations may be warranted based on an operating state of the managed device. In some instances, no management operations may be immediately necessary, but continued monitoring of a managed device by the third-party management tool may identify later opportunities for such management operations.

Once management operations have been identified, at 360, the third-party management tool may transmit MCTP management communications, which may include VDM commands, to the managed device. As described in additional detail with regard to FIG. 4, the MCTP commands that are transmitted to the managed device may be encapsulated within the HTTPS session that was established between the orchestration layer and the device management agent. Utilizing the provided embodiments, these MCTP commands may be transmitted to managed devices by third-party management tools in the same manner as existing systems, in that these MCTP commands may be transmitted to the IHS through existing channels. However, once these MCTP commands are received by the IHS and processed by the chipset of the IHS, at 365, the MCTP commands are routed by the chipset to the network stack established at block 320, rather than routing them via PCIe management channels supported by the operating system. In this manner, the chipset stores received MCTP commands to the network queue implemented in a secure IHS memory, where the network stack was initialized during pre-boot operations of the IHS, such as described above.

At 370, the device management agent may identify new MCTP commands on the network stack, such as through polling of the network stack or through subscription notification operations supported by the network stack. Once a new MCTP command has been identified the actual command and any payload included in the command may be recovered by the device management agent through decryption capabilities supported by the HTTPS session between the device management agent and the orchestration layer. If the new MCTP command is validated as being transmitted securely by orchestration layer, at 375, the device management agent may evaluate the decrypted command and payload in order to identify the specific managed device of the IHS that is the intended recipient of the MCTP command. Once the intended recipient has been identified, at 380, the device management agent may provide the MCTP payload, such as a VDM communication, to the correct managed device. In this manner, embodiments allow third parties to transmit management commands to managed devices securely and without relying strictly on security measures of the operating system or of a remote access controller in protecting management information that is transmitted from a remote third-party management tool to a managed device.

FIG. 4 is a swim lane diagram describing the operation of certain components of a system according to some embodiments, in configuring secure remote management of hardware components of an IHS. As described above, upon an IHS configured according to embodiments being initialized, various managed devices 405 of an IHS may be powered and enumerated, with such an enumeration serving, in some instances, to identify the managed devices as PCIe endpoints. As indicated in FIG. 4, at 435, a chipset 420 of the IHS may enumerate and identify the managed devices of an IHS as part of the initialization of the IHS. In some embodiments, the chipset 420 may identify and configure each of these managed devices as PCIe endpoints, where each managed device has been configured to respond to chipset enumeration requests and to provide information identifying the managed device to the chipset via a PCIe connection.

As described above, remote device management according to embodiments may be supported by a device management agent 410 that operates on the IHS. In some embodiments, device management agent 410 may be implemented as secure workspace that operates in isolation from the operating system of the IHS and that may be instantiated and placed in operation prior to the operating system of the IHS been booted. As described above, initialization of an IHS according to embodiments may include establishing a root of trust in a requisite set of hardware components of the IHS and establishing a secure communication channel with an orchestration layer 425. In some embodiments, during initialization of the IHS, the workspace orchestration service 420 generates a workspace definition for generating and operating a workspace on the IHS that functions as the device management agent 410.

As described above, a workspace definition may be selected based on factors such as the security context and the productivity context of the IHS that will host the workspace, the user making the request and/or the logical and physical environment in which the workspace will operate. Various types of context information may be provided to the workspace orchestration service 420 for use in selection of an appropriate workspace definition for deployment of a particular workspace on a particular IHS. Based on evaluation of the context information, the workspace orchestration service 420 transmits the workspace definition and other data for generating the device management agent 410 on the IHS. In some embodiments, the device management agent 410 may be a workspace or other process that operates based on UEFI firmware instructions, such as described with regard to FIG. 1. In some embodiments, rather than be a workspace that is separate from the operating system, the device management agent 410 may instead be a workspace that operating within the operating system or a secure function of the operating system of an IHS, such as management function that operates using instructions that may be validated by the orchestration layer prior to interfacing with the device management agent 410.

Once the device management agent 410 is operational, at 440, the agent is registered with the chipset 420 as the local management agent that will support the managed devices that have been enumerated and that have been determined as compatible with embodiments. In response, at 445, the chipset 420 creates a network stack 415 within a secure memory of the IHS. For instance, as described with regard to FIG. 1, an IHS may include a UEFI controller that has a secure internal memory, such as a UEFI memory space, that may be accessed by operating system components and also by pre-boot components of the IHS. In other instances, UEFI may operate based on validated firmware and may include instructions for accessing and creating partitions within a secure memory of the IHS. Chipset 420 may create a partition within this secure memory for use as a network stack 415 by which device management communications may be routed to managed devices independent of the operating system, or at least independent of the security provided by the operating system. At 450, the chipset 420 may notify the device management agent 410 of the existence and location of the network stack 415. In response, the device management agent 410 may be configured to periodically poll the network stack 415, or the network stack 415 or chipset may be configured to notify the device management agent 410 of new device management communications being added to the network stack. At 455, the chipset 420 may be programmed to route any received MCTP device management messages to the network stack 415, rather than attempt to process and deliver these MCTP communications via PCIe device management channels supported by the operating system.

Initialization of remote device management capabilities according to embodiments may continue, at 460, with the device management agent 410 retrieving the remote management capabilities of the managed devices 405, such as the VDM capabilities supported by each of these managed devices. At 462, the device management agent 410 may notify the orchestration layer of managed devices 405 that have been identified as compatible with embodiments, and thus that support VDM capabilities that may be used in remote management of the devices. As described, third parties may provide ongoing support of components of an IHS, such as the manufacturer of a network controller providing ongoing support of the component during the lifespan of the IHS. Accordingly, at 464, the orchestration layer 425 may relay notifications of compatible managed devices to third-party management tools 430 that are providing support for particular managed devices 405. In some embodiments, these third-party management tools 430 may operate as components of the orchestration layer 425 or may operate as trusted services that interoperate with the orchestration layer 425.

For each compatible managed device 405 or for groups of devices managed by the same third-party management tool, at 466, the third-party management tool 430 provides an HTTPS certificate to the device management agent 410. At 468, the device management agent 410 validates the authenticity of the provided certificate. If the provided certificate is successfully authenticated, at 470, an HTTPS session is established between the device management agent 410 and the third-party management tool 430. As illustrated in FIG. 4, initialization of the remote management capabilities continues, at 472, with the third-party tool 430 establishing an MCTP session with a compatible managed device 405 that is being supported using the third-party tool. As indicated in FIG. 4, this MCTP session is secured via the HTTPS session that has been established between the device management agent 410 and the third-party management tool 430. Once the MCTP session has been established, it is utilized by a managed device 405 to transmit an inventory of the device 405 to the third-party management tool 430, where the inventory details are secured via the HTTPS session between the device management agent 410 and the third-party management tool 430.

Using the received inventory information, the third-party management tool 430 may determine management operations to be pushed to the managed device 405. However, rather than secure the management operations using security protocols supported by the operating system, the third-party management tool 430 utilizes the secure HTTPS session established with the device management agent 410, but does so in the same manner as existing remote management systems, which is by transmitting MCTP commands to the IHS in which the managed device is installed. As such, at 476, the third-party management tool 430 may generate MCTP commands that may be transmitted to the IHS for delivery to a managed device. The command itself and any payload provided with the command may be encrypted for transmission via the secure HTTPS session.

Upon receipt by the IHS, such MCTP commands are identified by the chipset 420 and based on the configuration at 455, the MCTP commands are routed to the network stack 415. Upon detection of the commands being added to the network stack 415, the device management agent 410 retrieves an MCTP command that has been placed on the network stack 415. Utilizing credentials provided via the HTTPS session, at 478, the device management agent 410 may recover the encrypted command information and payload provided in the MCTP command retrieved from the network stack 415. In some instances, the command information and payload included in the MCTP communications may be a VDM generated by the third-party management tool 430. Using the recovered command information, at 480, the device management agent may identify the managed device 405 as the intended recipient of the command and may deliver the command information to the managed device 405.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of managed hardware components;
a secured memory;
a plurality of PCIe controllers;
one or more processors; and
a memory coupled to the processors, the memory storing program instructions that, upon execution by the processors, cause the IHS to:
prior to booting an operating system of the IHS, enumerate the plurality of managed hardware components as PCIe endpoints that each supporting remote management;
prior to booting the operating system, establish a network stack in the secured memory for delivery of PCIe remote device management messages directed at the plurality of managed hardware components;
prior to booting the operating system, configure routing of PCIe device management messages directed at the plurality of managed devices to the network stack such that these PCIe device management messages are not routed by any of the one or more PCIe controllers of the IHS;
after booting the operating system
retrieve the device management messages from the network stack and deliver the device management messages to the managed hardware components without reliance on the one or more PCIe controllers of the IHS.

2. The IHS of claim 1, further comprising:
a remote access controller that supports the remote management of the plurality of managed hardware components via sideband management couplings between the remote access controller and the managed hardware components.

3. The IHS of claim 1, wherein the secured memory is a UEFI (Unified Extensible Firmware Interface) memory partition.

4. The IHS of claim 1, wherein the remote device management messages are delivered without reliance on an operating system of the IHS.

5. The IHS of claim 1, wherein the remote device management messages comprise VDM (Vendor Defined Messages).

6. The IHS of claim 5, wherein the VDMs directed at the plurality of managed devices are received from remote management tools operating in support of one or more of the plurality of managed devices.

7. The IHS of claim 1, wherein the IHS is further configured to establish a secure remote management session between remote management tools and a device management agent that operates separate from an operating system of the IHS, where the session comprises a PCIe (Peripheral Component Interconnect express) MCTP (Management Component Transport Protocol) management session.

8. The IHS of claim 7, wherein the PCIe MCTP management session is encoded within an HTTPS connection between a respective remote management tool and the device management agent.

9. A method for remotely supporting a plurality of managed hardware components of an IHS (Information Handling System) comprising a plurality of PCIe controllers, the method comprising:
prior to booting an operating system of the IHS, enumerating the plurality of managed hardware components as PCIe endpoints that each supporting remote management;
prior to booting the operating system, establishing a network stack in a secured memory of the IHS, wherein the network stack is for delivery of PCIe remote device management messages directed at the plurality of managed hardware components;
prior to booting the operating system, configuring a routing of PCIe device management messages directed at the plurality of managed devices to the network stack such that these PCIe device management messages are not routed by any of the one or more PCIe controllers of the IHS;
after booting the operating system,
retrieving the device management messages from the network stack and deliver the device management messages to the managed hardware components without reliance on the one or more PCIe controllers of the IHS.

10. The method of claim 9, wherein the secured memory is a UEFI (Unified Extensible Firmware Interface) memory partition.

11. The method of claim 9, wherein the remote device management messages comprise VDM (Vendor Defined Messages).

12. The method of claim 11, wherein the VDMs directed at the plurality of managed devices are received from remote management tools operating in support of one or more of the plurality of managed devices.

13. The method of claim 9, further comprising establishing a secure remote management session between remote management tools and a device management agent that operates separate from an operating system of the IHS, where the session comprises a PCIe (Peripheral Component Interconnect express) MCTP (Management Component Transport Protocol) management session.

14. The method of claim 13, wherein the PCIe MCTP management session is encoded within an HTTPS connection between a respective remote management tool and the device management agent.

15. A system for remotely supporting a plurality of managed hardware components of an IHS (Information Handling System), the system comprising:
a workspace orchestration layer that is remote from the IHS and that manages deployment of workspaces on the IHS; and
the IHS comprising:
a plurality of managed hardware components;
a secured memory;
a plurality of PCIe controllers;
one or more processors; and
a memory coupled to the processors, the memory storing program instructions that, upon execution by the processors, cause the IHS to:

prior to booting an operating system of the IHS, enumerate the plurality of managed hardware components as PCIe endpoints that each supporting remote management;

prior to booting the operating system, establish a network stack in the secured memory for delivery of PCIe remote device management messages directed at the plurality of managed hardware components;

prior to booting the operating system, configure routing of PCIe device management messages directed at the plurality of managed devices to the network stack such that these PCIe device management messages are not routed by any of the one or more PCIe controllers of the IHS;

after booting the operating system retrieve the device management messages from the network stack and deliver the device management messages to the managed hardware components without reliance on the one or more PCIe controllers of the IHS.

16. The system of claim 15, wherein the secured memory is a UEFI (Unified Extensible Firmware Interface) memory partition.

17. The system of claim 15, wherein the remote device management messages comprise VDM (Vendor Defined Messages).

18. The system of claim 17, wherein the VDMs directed at the plurality of managed devices are received from the remote management tools operating in support of one or more of the plurality of managed devices.

19. The system of claim 15, wherein the IHS is further configured to establish a secure remote management session between remote management tools and a device management agent that operates separate from an operating system of the IHS, where the session comprises a PCIe (Peripheral Component Interconnect express) MCTP (Management Component Transport Protocol) management session.

20. The system of claim 19, wherein the PCIe MCTP management session is encoded within an HTTPS connection between a respective remote management tool and the device management agent.

\* \* \* \* \*